(No Model.)
F. & G. W. ANSLEY.
COMBINED MILK PAIL AND STRAINER.
No. 475,375. Patented May 24, 1892.
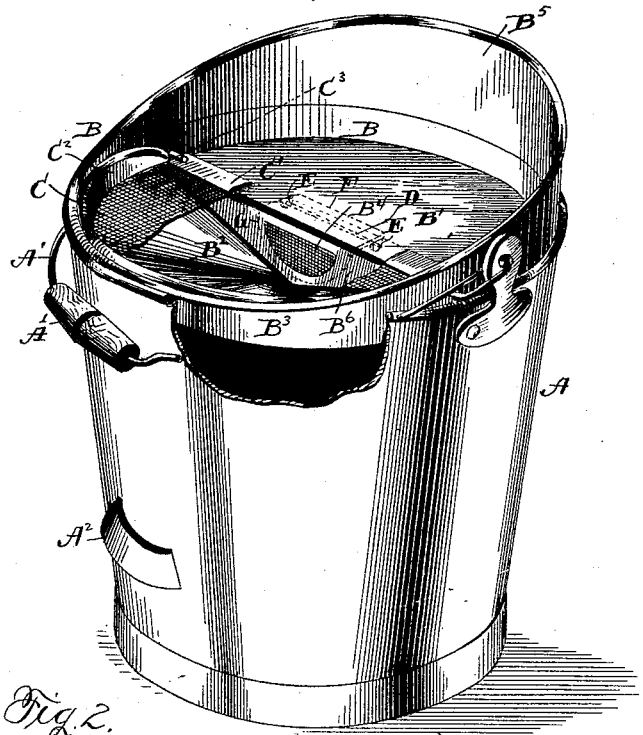
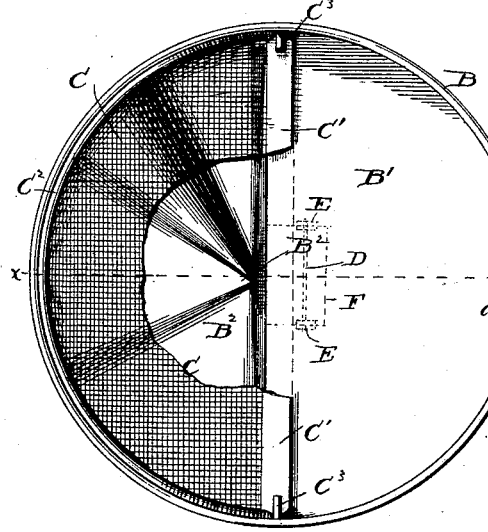
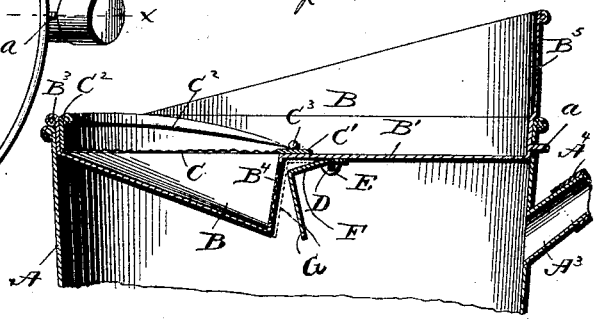
Witnesses
C. J. Williamson
A. L. Hough
Inventors
Frank and George W. Ansley
by Franklin H. Hough
Atty.

United States Patent Office.

FRANK ANSLEY AND GEORGE W. ANSLEY, OF MEDICAL LAKE, WASHINGTON.

COMBINED MILK PAIL AND STRAINER.

SPECIFICATION forming part of Letters Patent No. 475,375, dated May 24, 1892.

Application filed July 15, 1891. Serial No. 399,606. (No model.)

*To all whom it may concern:*

Be it known that we, FRANK ANSLEY and GEORGE W. ANSLEY, citizens of the United States, residing at Medical Lake, in the county of Spokane and State of Washington, have invented certain new and useful Improvements in a Combined Milk Pail and Strainer; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in combined milk pails and strainers; and it has for its object to provide a simple and inexpensive milk-pail of the character described, which may be easily cleaned and will serve to keep the contents of the pail entirely free from dirt or other foreign substances.

The invention has for a further object to provide means whereby in the event of the pail at any time being accidentally tipped over the milk will not be allowed to escape from the pail.

To these ends and to such others as the invention may pertain the same consists in the peculiar construction and in the novel combination, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1 is a perspective view of a combined milk pail and strainer embodying our improvements, the same being shown with parts broken away in order to best show the arrangement of the parts. Fig. 2 is a top plan, with a portion of the upper strainer broken away. Fig. 3 is a vertical section upon the line $x\,x$ of Fig. 2.

Reference now being had to the details of the drawings by letter, A designates the pail, which in size and form is similar in all respects to milk-pails which are in common use, and is provided with the usual bail A' and handle A². Near the upper edge of the pail, upon the side opposite to that which is provided with the handle A², is provided a discharge spout or tube A³, having a cap or cover A⁴.

Fitted within the upper part of the pail is a tray or pan B, which is made of sheet metal. One half of the bottom of the tray B is upon a horizontal plane, as shown at B', the remaining half B² being concave, as shown, with the vertical wall B³ uniting the inner edges of the said portions. Fitted within an opening formed in the upper portion of the vertical wall B⁶, near its upper edge, is a strip of wire-gauze B⁴. The outer edge of the tray B, upon the side which is provided with the horizontal bottom B', is provided with an upwardly-extended vertical rim B⁵, and projecting from the outer face of the rim of the tray upon this side is a pin or projection $a$, adapted to engage a corresponding opening in the upper edge of the pail, as shown in Fig. 3 of the drawings.

C is the main strainer, which consists of a semicircular piece of wire-gauze, having secured to its straight edge a metallic strip C' and at its opposite edge being provided with an upwardly-extending sheet-metal rim C². When in place within the pail, the ends of the metallic strip C' are passed beneath the inwardly-extended pins C³ at opposite sides of the pail and extending inward, and the body of the strainer covers the depressed or concave portion of the bottom of the tray.

When in use, it will be seen that when the milk passes through the gauze strainer C it will come into contact with the inclined face of the concave portion of the bottom of the tray B at an angle, and thus will not spatter. When the milk has risen in the concaved portion of the tray to the level of the strainer B⁴, it will pass through said strainer into the pail. The tray is removed by tilting it and first moving it horizontally to disengage the pins C³ and bar C' and then removing the lug $a$ from its slot.

Pivotally attached to the bottom of the horizontal portion B' of the tray B by means of a rod D, which is passed through the ears E, which depend from the bottom of the tray, is a strip of sheet metal F, said strip having a portion G at right angles to the body portion, which is adapted when the pail is tilted to close over the strainer $B^4$ and prevent the milk from passing therethrough.

Having thus described our invention, what we claim to be new, and desire to secure by Letters Patent, is—

1. A removable tray for a milk-pail, having one portion substantially flat and its other portion concaved, with a substantially-vertical part connecting said portions, a strainer in said vertical part, an angular plate pivoted to the under side of the straight horizontal portion and adapted to close with its vertical portion against said strainer, and a strainer over the said concaved portion, substantially as and for the purpose described.

2. The herein-described improvement in a combined milk pail and strainer, the same consisting of a pail, a tray fitted within the top of the pail, said tray having a semicircular horizontal portion $B'$ and concave portion $B^3$, vertical wall $B^6$, provided with a gauze-covered opening $B^4$, a pivoted angular plate attached to the bottom of the tray and adapted when the pail is tilted to close the passage to the opening $B^4$, an outlet-tube communicating with the pail below the tray, and a handle adapted for use in tilting the pail, all substantially as shown and described, and for the purpose specified.

3. The combination, with the pail having lateral pins $C^3$, of a tray having its bottom with one half horizontal and the other half concave, with a vertical connecting portion having a gauze opening, the outer edge having lateral projection $a$, a strainer above the concave portion, and an angular plate hinged to the horizontal portion, with its vertical portion bearing on the vertical portion of the bottom of the tray, substantially as described.

In testimony whereof we affix our signatures in presence of two witnesses.

FRANK ANSLEY.
GEORGE W. ANSLEY.

Witnesses:
ELIZA J. TATE,
JOHN TATE.